United States Patent
Asano

(10) Patent No.: US 6,837,454 B2
(45) Date of Patent: Jan. 4, 2005

(54) RECORDING TAPE CASSETTE

(75) Inventor: Katsuki Asano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 66 days.

(21) Appl. No.: 10/435,681

(22) Filed: May 12, 2003

(65) Prior Publication Data

US 2003/0234306 A1 Dec. 25, 2003

(30) Foreign Application Priority Data

May 10, 2002 (JP) .................................. 2002-135048

(51) Int. Cl.[7] .................................................. G11B 23/087
(52) U.S. Cl. ..................................... 242/341; 242/610
(58) Field of Search ............................... 242/341, 347, 242/610, 610.6, 914

(56) References Cited

U.S. PATENT DOCUMENTS

| | | | | |
|---|---|---|---|---|
| 4,482,104 A | * | 11/1984 | Saito | ......................... 360/132 |
| 5,383,077 A | * | 1/1995 | Sato et al. | .................. 360/132 |
| 5,479,311 A | * | 12/1995 | Doushita et al. | ............. 360/132 |
| 5,914,840 A | * | 6/1999 | Kawakami et al. | |
| 5,976,668 A | * | 11/1999 | Chiba et al. | |
| 6,607,156 B2 | * | 8/2003 | Murao et al. | |
| 6,622,952 B2 | * | 9/2003 | Onmori et al. | .............. 360/132 |
| 6,688,546 B2 | * | 2/2004 | Onmori et al. | .............. 242/347 |

FOREIGN PATENT DOCUMENTS

| | | |
|---|---|---|
| JP | 10-269743 A | 10/1998 |
| JP | 2000-48529 A | 2/2000 |

* cited by examiner

Primary Examiner—William A. Rivera
(74) Attorney, Agent, or Firm—Sughrue Mion, PLLC

(57) ABSTRACT

A recording tape cassette capable of allowing a thin recording tape to run properly. At this recording tape cassette, a pair of reels which include lower flanges and upper flanges at vertical ends of reel hubs are each rotatably accommodated in a case. The reels cause a magnetic tape to run while winding from one reel and winding onto the other reel. At least one of the lower flange and upper flange of each reel, which contacts the running magnetic tape, are formed by resin-molding using a resin material whose surface electrical resistance value is $1 \times 10^{13} \Omega$ or less, and is resistant to static charging. Consequently, a thin magnetic tape whose thickness is less than 13 μm runs suitably without being drawn toward the lower flanges or the like by electrostatic force.

15 Claims, 2 Drawing Sheets

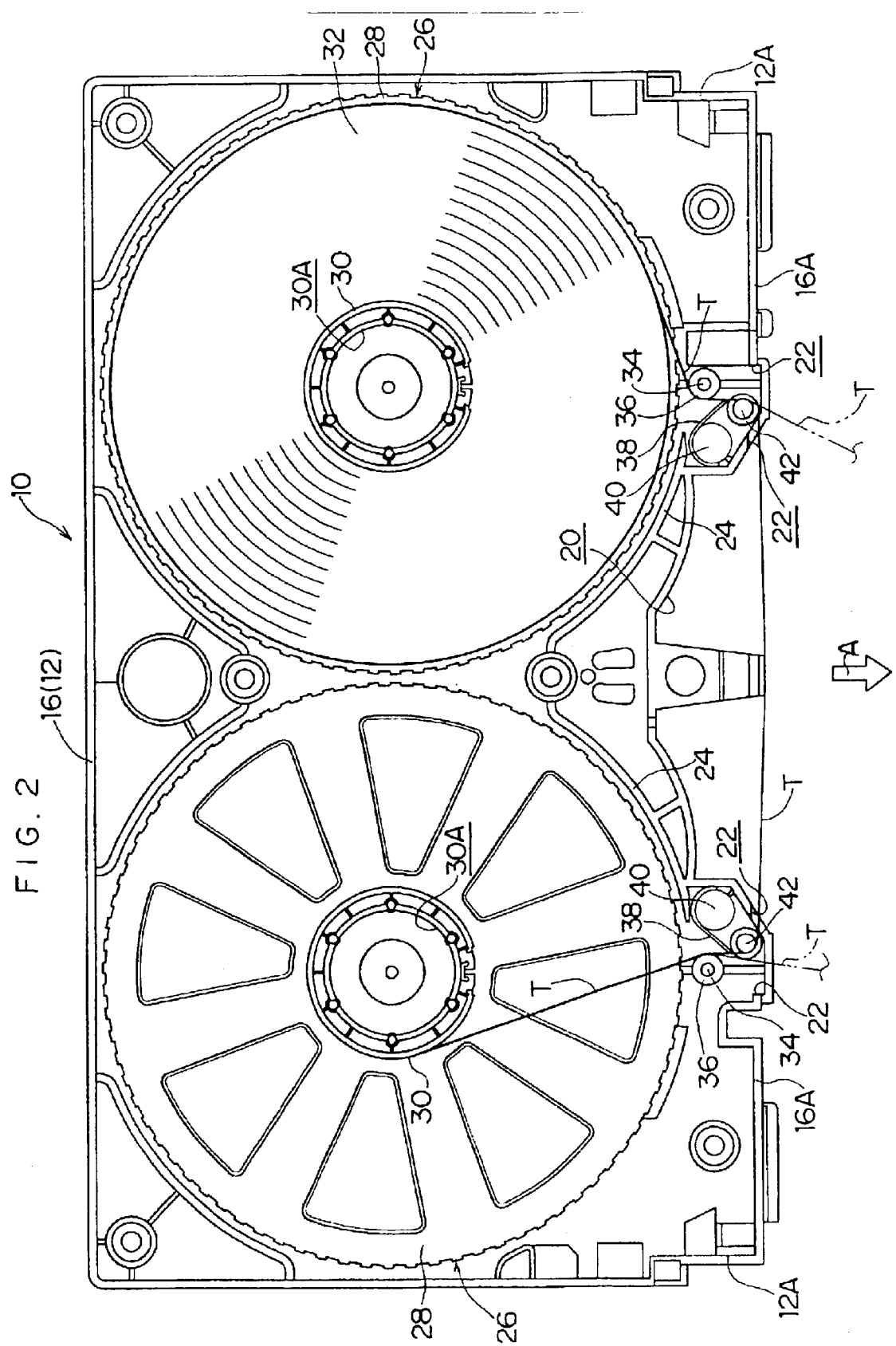

RECORDING TAPE CASSETTE

BACKGROUND OF THE INVENTION

1. Field of the Invention

The present invention relates to a recording tape cassette which rotatably accommodates a reel, on which recording tape is wound, in a case.

2. Description of the Related Art

A recording tape cassette which accommodates, in a case, a reel on which a recording tape such as a magnetic tape or the like is wound is employed, for example, as a recording medium for an audio device, a video device or the like. When information is to be recorded on the recording tape, or information that has been recorded on the recording tape is to be replayed, the reel is rotated and, while the recording tape is wound out or wound back, the recording tape is passed through a vicinity of (or slidingly contacted with) a recording head which is disposed in a recording/playback device such as a tape deck or the like.

The reel is structured with a reel hub and a pair of flanges. The recording tape is wound on the reel hub. The flanges are provided at both ends of the reel hub in an axial direction thereof, and restrict displacement of the recording tape in the axial direction (a width direction of the recording tape). For such a recording tape cassette, in consideration of lightness and processability, principal components, such as the case, the reel and the like, are formed by resin-molding.

In recent years, because of demands for improvements in recording capacity, reductions in thickness of recording tapes, which have conventionally had thicknesses of 13 $\mu$m or more, have been under consideration.

However, for a conventional recording tape cassette, the reel is formed by resin-molding using a general purpose resin material. Because a surface electrical resistance value of this resin material is greater than $1\times10^{16}\Omega$, there has been a problem in that the reel is susceptible to static charging. In consequence, when a flange of the reel slides against the case, the recording tape and the like, and the reel becomes statically charged, the recording tape that is being wound out from the reel or wound back to the reel experiences an attractive force (electrostatic attraction) to a flange side (particularly a lower flange side) thereof.

When this electrostatic attraction acts on a recording tape with a conventional thickness, strength of the tape is high and problems do not occur. However, when it is sought to make a recording tape thinner, as described above, the recording tape is drawn toward a flange of the reel by the electrostatic attraction. Thus, in a case in which a thin recording tape is employed, this electrostatic attraction is a cause of hindrance to proper running of the recording tape.

SUMMARY OF THE INVENTION

In consideration of the circumstances described above, an object of the present invention is to provide a recording tape cassette at which a thin recording tape can be allowed to run properly.

In order to achieve the object described above, in accordance with a first aspect of the present invention, a tape cassette which can be inserted at a tape drive which carries out at least one of reading and writing of data while the tape cassette is inserted is provided, the tape cassette including: a case; a reel rotatably disposed in the case, the reel including a reel hub and a flange which is disposed at one axial direction end of the reel hub; a tape which is unwindably wound on at the reel hub, wherein the tape includes a thickness of less than 13 $\mu$m, and the flange is formed from resin material which includes a surface electrical resistance value of $1\times10^{13}\Omega$ or less.

In accordance with another aspect of the present invention, a tape cassette which can be inserted at a tape drive which carries out at least one of reading and writing of data while the tape cassette is inserted is provided, the tape cassette including: a case; a pair of reels rotatably disposed in the case, each reel including a reel hub and a flange which is disposed at one axial direction end of the reel hub; a tape which is unwindably wound on at the two reel hubs, wherein the tape includes a thickness of less than 13 $\mu$m, and each of the flanges is formed from resin material which includes a surface electrical resistance value of $1\times10^{13}\Omega$ or less.

BRIEF DESCRIPTION OF THE DRAWINGS

FIG. 2 is a plan view of the recording tape cassette relating to the embodiment of the present invention, viewed with an upper case and upper flanges removed.

DETAILED DESCRIPTION OF THE PREFERRED EMBODIMENTS

Figure 1:
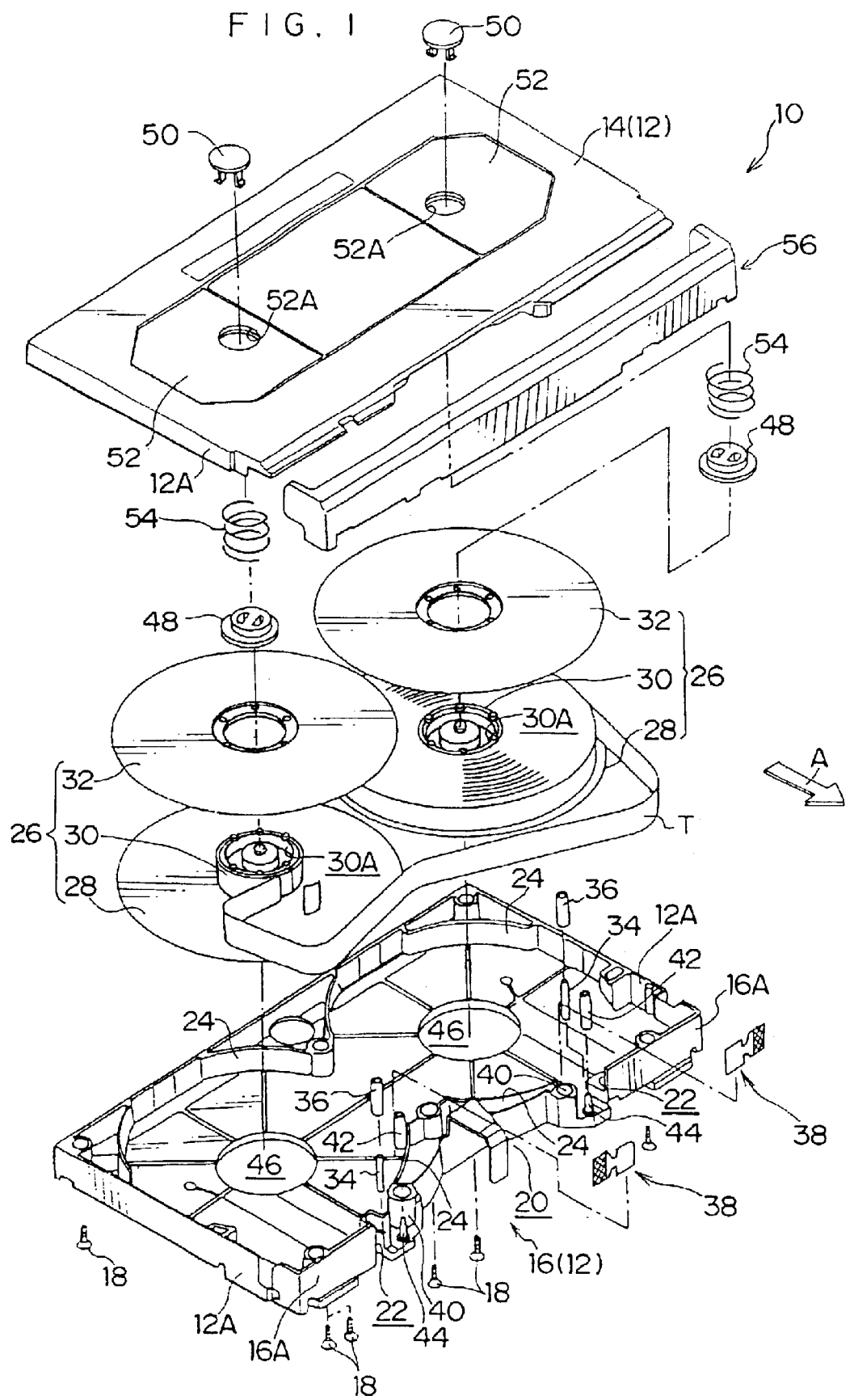
FIG. 1 is an exploded perspective view of a recording tape cassette relating to an embodiment of the present invention.

A recording tape cassette 10 relating to an embodiment of the present invention will be described on the basis of FIGS. 1 and 2. In this description, a direction of loading the recording tape cassette into a recording/playback device (an audio device, a video device or the like), as shown by arrow A, is taken to be a forward direction.

As shown in FIG. 1, the recording tape cassette 10 (a BETACAM L cassette), which is provided with a magnetic tape T that is to be employed for professional uses at a broadcasting station or the like, is provided with a substantially rectangular box-shaped case 12 which is longer in a left-right direction than in a front-rear direction. The case 12 is structured by fitting together an upper case 14 and a lower case 16, which are each formed by resin-molding of polyacetal (below referred to as POM), acrilonitrile butadiate styrene (below referred to as ABS) or the like, using a plurality of screws 18.

A recess portion 20 is formed in the lower case 16. The recess portion 20 is recessedly formed at an inner side (i.e., a side opposite from an arrow A side) of a left-right direction central portion of a front side portion of the lower case 16. A pair of left and right tape apertures 22, which are formed by cutting away a front wall 16A of the lower case 16, are located at two sides of the recess portion 20 in the left-right direction.

A pair of free-play restricting walls 24, which form substantially circular tube shapes which are partially cut away, are provided standing at an inner face of the lower case 16. A pair of reels 26 are rotatably accommodated at respective inner sides of the free-play restricting walls 24. Each of the reels 26 is structured by a lower flange 28, a reel hub 30, and an upper flange 32. The reel hub 30 is formed coaxially and integrally at an upper side of the lower flange 28, and the upper flange 32 is attached by welding or the like at an upper end of the reel hub 30. Materials of the reels 26 are described later.

An intermediate portion of the magnetic tape T passes through the pair of tape apertures 22 and is disposed along a front edge portion of the recess portion 20 (at an outer side of the case 12). End portions of the magnetic tape T are connected to respectively different the reel hubs 30 of the reels 26. When the recording tape cassette 10 is not in use, the magnetic tape T is usually wound round (wound onto) one or other of the reel hubs 30 of the reels 26.

At an inner side of each of the tape apertures 22 of the lower case 16, an unillustrated retention hole is formed. At each of these retention holes, one end portion of a shaft 34, which is made of metal, is fitted in and retained by the retention hole. Each shaft 34 is also fitted into a corresponding unillustrated retention hole formed in the upper case 14, in a state in which the shaft 34 rotatably supports a circular tube-form guide roller 36, through which the shaft 34 is inserted. As is also shown in FIG. 2, at this structure, the magnetic tape T that passes between the reel 26 and the tape aperture 22 is wound about the guide roller 36. A material of the guide roller 36 is described later.

At a vicinity of each guide roller 36, a corresponding tape pad 38 is provided. The tape pad 38 is formed in a sheet shape, and one end portion thereof is retained between one of the free-play restricting walls 24 of the lower case 16 and a pocket portion 40 which is provided at a vicinity of an edge portion of the tape aperture 22. Thus, each tape pad 38 abuts against a rear face side of the magnetic tape T in a state in which the tape pad 38 is resiliently deformable in a thickness direction thereof. The tape pad 38 pushes the magnetic tape T from a rear face side thereof, and prevents slackening of the magnetic tape T.

That is, the tape pad 38 is structured to function as a plate spring which applies tension to the magnetic tape T. A material of the tape pad 38 is described later. Consequently, while the magnetic tape T is running, the magnetic tape T is pressed by a moderate urging force from the tape pad 38, and disadvantages such as the magnetic tape T being bitten into or damaged are avoided. Incidentally, a reference hole (not shown), which opens downward and acts as a reference for positioning of the recording tape cassette 10 in a recording/playback device, is formed in the pocket portion 40.

A guide shaft 42, which is made of metal, is provided at an inner side of each tape aperture 22, at a forward side relative to the corresponding tape pad 38. The guide shaft 42 is fitted over a root portion of a pin 44, which is provided standing at the lower case 16, and consequently the guide shaft 42 is non-rotatably attached to the lower case 16. The rear face side of the magnetic tape T, which is a non-recording face, is wound about each guide shaft 42. Thus, together with the guide rollers 36, the guide shafts 42 are a structure which guides the magnetic tape T.

As described above and as shown in FIG. 2, the magnetic tape T passes through each tape aperture 22 in a state in which the magnetic tape T traverses between the two guide shafts 42 without an intermediate portion of the magnetic tape T slackening, and is disposed at the outer side of the case 12 (at the recess portion 20). Incidentally, the recording tape cassette 10 is provided with a pair of left and right locking means (not shown), which restrict rotation of each of the reels 26 in a direction of slackening. This structure suppresses rotation of the reels 26 in the slackening directions when the recording tape cassette 10 is not in use.

In the reel hub 30 of each reel 26, a reel rotation gear (not shown) is provided at a lower portion of the reel hub 30. The reel rotation gear is exposed to the outside through a gear aperture 46, which is formed in the lower case 16 to be coaxial with the corresponding free-play restricting wall 24.

In the reel hub 30 of each reel 26, an annular recess portion 30A is formed at an upper portion of the reel hub 30. A tubular portion of a reel holder 48, which has a circular tube shape with a base, enters into the recess portion 30A. At a base portion of each reel holder 48, which is located at an upper end of the reel holder 48, a center cap 50 is engaged. Through-holes 52A are formed in a pair of left and right window plates 52, which are structured by transparent plates of the upper case 14. Each center cap 50 is engaged at opening edges of the corresponding through-hole 52A. Between each reel holder 48 and window plate 52, a compression coil spring 54 is disposed. Thus, the reels 26 are urged to respective lower case 16 sides thereof by urging forces of the compression coil springs 54.

The recording tape cassette 10 is also provided with a cover 56, which covers the front side of the case 12. The cover 56 is formed by resin-molding of POM, ABS or the like. Two end portions of the cover 56 are rotatably supported at front ends of two side walls 12A of the case 12. By rotation thereabout, the cover 56 can attain a covering position, at which the cover 56 covers the tape apertures 22 (the front wall 16A) and the recess portion 20, and an exposure position, at which the cover 56 is disposed upward relative to the upper case 14, and the tape apertures 22 and the recess portion 20 are exposed.

Accordingly, when the recording tape cassette 10 is not loaded at a recording/playback device, the cover 56 is disposed at the covering position and covers the magnetic tape T that is exposed at the recess portion 20 of the case 12, and when the recording tape cassette 10 is loaded at a recording/playback device, the cover 56 rotates to the upper side of the upper case 14 and moves to the exposure position so as to enable drawing out, in the direction of arrow A, of the magnetic tape T that is exposed at the recess portion 20 (refer to the imaginary lines in FIG. 2).

Next, materials of the reels 26, the guide rollers 36 and the tape pads 38 will be described. The reels 26, guide rollers 36 and tape pads 38 are formed by resin-molding using resin materials with respective surface electrical resistance values of $1 \times 10^{13} \Omega$ or less. That is, resin materials whose surface electrical resistance values satisfy the above requirement (to not exceed $1 \times 10^{13} \Omega$) according to a predetermined measurement method (for example, a measurement method according to ASTM-D257) under predetermined conditions (a predetermined environment) are employed.

Specifically, for formation of the lower flanges 28 structuring the reels 26 (and the reel hubs 30 integrally formed therewith) and the upper flanges 32, in consideration of mechanical strengths that are required therefor, a resin material in which an anti-static agent (for example, a nylon-based resin and/or other additive) is added to, for example, general purpose ABS or general purpose POM, or a resin material or the like of a grade corresponding to TOYOLAC PARREL (registered trademark) may be employed. Furthermore, for formation of the upper flanges 32, it is preferable to employ a transparent or semi-transparent resin, in order that a remaining tape amount can be visually observed through the window plates 52 of the upper case 14.

For formation of the guide rollers 36, in consideration of mechanical strength and slidability required therefor, a resin material or the like in which an anti-static agent is added to, for example, general purpose POM may be employed. Further, for formation of the tape pads 38, in view of flexibility required therefor, a resin material in which an anti-static agent has been added to, for example, general purpose polyethylene terephthalate (PET) may be employed.

Hence, thickness of the magnetic tape T that is employed in the recording tape cassette 10 described above may be set to 12 μm or less.

Next, operation of the present embodiment will be described.

With the recording tape cassette 10 having the structure described above, when the recording tape cassette 10 is loaded at a recording/playback device at a time of use, the cover 56 moves to the exposure position and a locking state of the reels 26 by the locking means is released. Accordingly, the magnetic tape T is drawn out, from the portion thereof that is disposed at the recess portion 20, to the arrow A side. The magnetic tape T is unwound from one of the reels 26 and wound onto the other of the reels 26. The magnetic tape T runs along a predetermined running path while being guided by the guide rollers 36, the guide shafts 42 and guide members of the recording/playback device.

At this time, width direction end portions of the magnetic tape T principally slide against the lower flanges 28, and thus misplacement of the magnetic tape T in the width direction thereof is restricted. The magnetic tape T runs without slackening while slidingly contacting the guide rollers 36 and the tape pads 38, and recording of information on the magnetic tape T and playback of information that has been recorded on the magnetic tape T is implemented by a recording/playback head which is disposed along the aforementioned predetermined running path of the recording/playback device.

Because thickness of the magnetic tape T is 12 $\mu$m or less, which is extremely thin, a length thereof which can be wound on the reels 26 is increased, and recording capacity of the recording tape cassette 10 is improved.

Here, the lower flanges 28 of the reels 26, which slide easily against the magnetic tape T, are formed by resin-molding using a resin material which has a surface electrical resistance of $1\times10^{13}\Omega$ or less under the above-mentioned predetermined conditions. That is, actual surface electrical resistance values, under running conditions, of portions of the reels 26 that are in contact with the running magnetic tape T are small. Therefore, the reels 26 are less susceptible to static charging. Consequently, even when a thin magnetic tape T whose thickness is 12 $\mu$m or less is in contact with the lower flanges 28, the occurrence of electrostatic attraction (a force drawing the magnetic tape T to the lower flange 28 side thereof) is small, and proper running of the thin magnetic tape T can be assured. In particular, in the recording tape cassette 10 described above, because the reels 26 are formed as a whole using resin material whose surface electrical resistance value is not more than $1\times10^{13}\Omega$, the reels 26 are even less susceptible to static charging.

Further, because both the guide rollers 36 and the tape pads 38, which are members made of resin that are in contact with the running magnetic tape T (members which are always likely to be statically charged), are formed using resin material whose surface electrical resistance value is not more than $1\times10^{13}\Omega$, the guide rollers 36 and tape pads 38 are, like the reels 26, less susceptible to static charging due to contact with the magnetic tape T. Accordingly, the magnetic tape T which is thin as described above runs even more properly. In addition, static charging of the magnetic tape T itself is avoided, and drawing of the magnetic tape T towards members made of resin and the like that are disposed on the predetermined running path is avoided.

Accordingly, with the recording tape cassette 10 relating to the present embodiment, a thin magnetic tape T can be made to run suitably.

Now, the present embodiment is preferably structured with both the guide rollers 36 and the tape pads 38 being formed using resin materials whose surface electrical resistance values are $1\times10^{13}\Omega$ or less. However, the present invention is not limited thus. It is sufficient that, at least, one or both of the lower flanges 28 and the upper flanges 32 of the reels 26 are structured with resin material that is less susceptible to static charging (it is more preferable to structure the lower flanges 28 with a resin material that is less susceptible to static charging), and one or both of the guide rollers 36 and the tape pads 38 may be formed with a general purpose resin material. Furthermore, if the lower flanges 28 and the reel hubs 30 are formed as separate components, the lower flanges 28 alone may be structured with a resin material that is less susceptible to static charging.

Furthermore, the embodiment described above is structured to include two reels 26, for winding and for unwinding. However, the present invention is not limited thus. Obviously, the present invention may be applied to, for example, a "single reel" recording tape cassette (a recording tape cartridge) which is provided with just one of the reels 26 in a case.

Further still, in the embodiment described above, the tape pads 38 are structured to be formed overall by resin-molding using a resin material that is less susceptible to static charging. However, the present invention is not limited thus. For example, the tape pads 38 may be structured by applying a thin sheet (a film) or the like, which is structured of a resin material that is less susceptible to static charging, at portions of the tape pads 38 that slidingly contact against the magnetic tape T.

Further yet, the embodiment described above is preferably structured with a magnetic tape T whose thickness is 12 $\mu$m or less. However, the present invention is not limited thus. It is sufficient if the thickness of the magnetic tape T is less than 13 $\mu$m.

A recording tape cassette relating to the present invention as described above has excellent effects in that a thin recording tape can be made to run properly.

What is claimed is:

1. A tape cassette which can be inserted at a tape drive which carries out at least one of reading and writing of data while the tape cassette is inserted, the tape cassette comprising:
   a case;
   a reel rotatably disposed in the case, the reel including a reel hub and a flange which is disposed at one axial direction end of the reel hub;
   a tape which is unwindably wound on at the reel hub, wherein the tape includes a thickness of less than 13 $\mu$m, and the flange is formed from resin material which includes a surface electrical resistance value of $1\times10^{13}\Omega$ or less.

2. The tape cassette of claim 1, wherein the flange is capable of restricting movement of the tape in a width direction of the tape.

3. The tape cassette of claim 1, wherein the flange is substantially coaxial with the reel hub.

4. The tape cassette of claim 1, wherein the reel further comprises another flange, which is disposed at another axial direction end of the reel hub.

5. The tape cassette of claim 4, wherein the other flange is formed from resin material which includes a surface electrical resistance value of $1\times10^{13}\Omega$ or less.

6. A tape cassette which can be inserted at a tape drive which carries out at least one of reading and writing of data while the tape cassette is inserted, the tape cassette comprising:

a case;

a pair of reels rotatably disposed in the case, each reel including a reel hub and a flange which is disposed at one axial direction end of the reel hub;

a tape which is unwindably wound on at the two reel hubs, wherein the tape includes a thickness of less than 13 $\mu$m, and each of the flanges is formed from resin material which includes a surface electrical resistance value of $1\times10^{13}\Omega$ or less.

7. The tape cassette of claim 6, wherein each of the flanges is capable of restricting movement of the tape in a width direction of the tape.

8. The tape cassette of claim 6, wherein each of the flanges is substantially coaxial with the corresponding reel hub.

9. The tape cassette of claim 6, wherein each reel further comprises another flange, which is disposed at another axial direction end of the reel hub.

10. The tape cassette of claim 9, wherein the another flanges are formed from resin material which includes a surface electrical resistance value of $1\times10^{13}\Omega$ or less.

11. The tape cassette of claim 6, further comprising at least one guide roller for guiding the tape.

12. The tape cassette of claim 11, wherein the at least one guide roller is formed from resin material which includes a surface electrical resistance value of $1\times10^{13}\Omega$ or less.

13. The tape cassette of claim 6, further comprising at least one tape pad capable of pushing the tape for preventing slackening of the tape.

14. The tape cassette of claim 13, wherein the at least one tape pad is formed from resin material which includes a surface electrical resistance value of $1\times10^{13}\Omega$ or less.

15. The tape cassette of claim 13, wherein the at least one tape pad comprises a plate spring form.

* * * * *